3,462,178
Patented Aug. 19, 1969

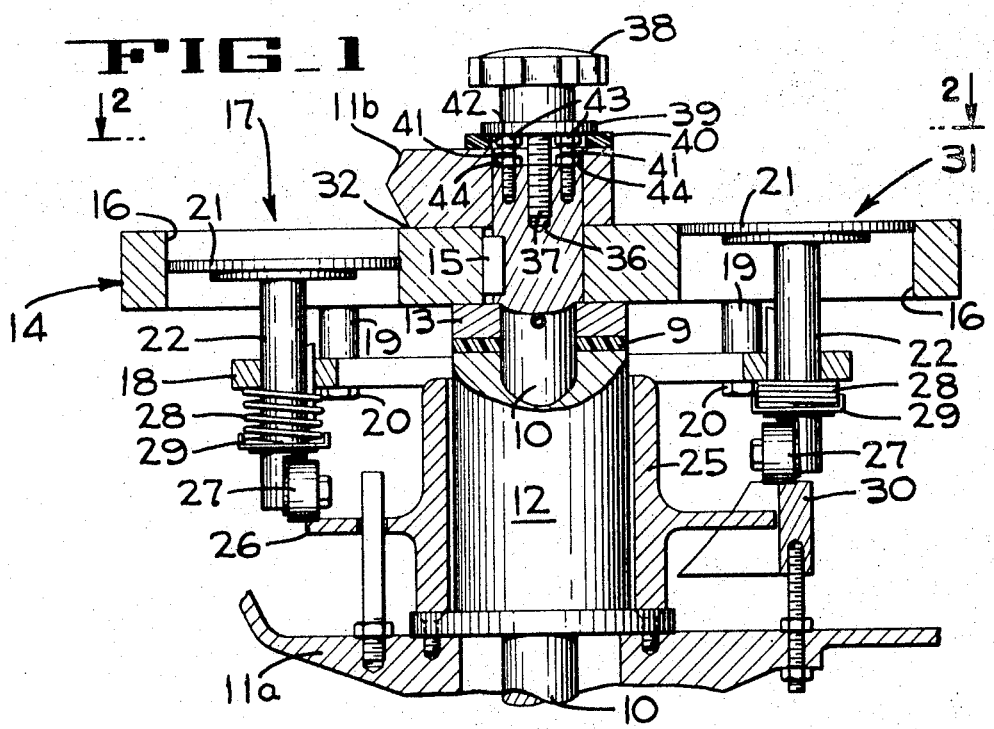

1

3,462,178
MECHANISM FOR MOUNTING ROTARY MEMBER IN FOOD PROCESSING MACHINERY
Eugene F. Felstehausen, Hoopeston, Ill., assignor to FMC Corporation, San Jose, Calif., a corporation of Delaware
Filed Dec. 1, 1966, Ser. No. 598,438
Int. Cl. F16d *1/06;* F16c *3/10;* B60b *27/06*
U.S. Cl. 287—52.07                                  4 Claims

ABSTRACT OF THE DISCLOSURE

The present invention relates to food processing machinery of the type having a rotary member, or turret (as shown, for example, in U.S. Patent 3,153,808) and, more particularly, to mechanism for mounting the rotary member thereof. The rotary member is mounted on a base member by means of a two part hub which is separable to remove the rotary member for cleaning. Each portion of the hub has a flange, and, when the hub is assembled, the flanges hold the rotary member and base member in operating relationship. Each portion of the hub has an abutment surface which engages the abutment surface on the other hub portion when the hub is assembled to mount the rotary member. Mutual contact of the abutment surfaces on the respective portions of the hub assures the same precise spacing between the hub flanges when the hub is assembled, and hence assures precise clearance between the rotary member and the base member for rotation.

---

In mounting a rotary turret member for minimal fraction in any type of machine on a fixed base member thereof, there must be clearance between the two members so that the rotary member will be free to turn relative to the fixed member. In the usual case, the rotary member is permanently mounted on the fixed member and, if proper clearance is initially provided when the members are assembled, no difficulty is encountered in maintaining proper clearance. Moreover, in the typical installation, the amount of clearance between the rotary member and the fixed member is not critical, and, if the clearance between the two members should change, the effect on the operation would be negligible.

In certain food processing machinery, however, a more difficult problem arises in mounting the rotary turret. For example, in a machine to form meat patties, the rotary turret in which the patties are formed must have clearance with the base member on which it is mounted for rotation, but this clearance must be minimal to prevent entry of food particles between the members. Any meat which gets between the turret and the base will not only impair rotation of the turret, but will quickly spoil. Contaminated meat on or near the turret could become mingled with meat in the patties and must, therefore, be avoided.

In meat molding machinery, it is essential that the rotary turret be disassembled from the base frequently for cleaning. When this is done, it is desirable that, on reassembly, the same minimal clearance be provided between the rotary turret and the base.

In the present invention, mechanism is provided for mounting the rotary turret of a food processing machine on the base of the machine with minimal clearance. The mechanism can be disassembled and reassembled quickly without altering the desired clearance. In the preferred form of the invention, a rotatable drive shaft having an end cap defines a hub which extends through the turret and a base plate. A flange on the drive shaft and a flange on the end cap straddle the turret and base plate to hold

2 these members in operating relationship. Two set screws threadedly received in the end of the drive shaft have heads which define abutment surfaces to contact the abutment surface defined by the flange on the end cap. The end cap is mounted adjacent to and above the base plate, and a plastic washer is received between the base plate and the flange on the end cap. The turret is supported adjacent to and below the base plate by the flange on the drive shaft. Since the drive shaft is supported by the base plate (through the washer and end cap), the weight of the turret will assure a clearance between the turret and base plate of a size depending on the span between the flange on the drive shaft and the flange on the end cap. The abutment surfaces on the drive shaft and end cap, which contact on assembly of the hub, assure that the span between the two flanges is always of the same size to leave a clearance between the turret and the base plate which is always of the same size.

With this construction, the spacing between the flange on the drive shaft and the flange on the end cap can be adjusted precisely by adjustment of the set screws which extend between the drive shaft and the flange on the end cap. Precise adjustment between these members will establish a precise clearance between the base plate and the rotary turret which, because of the precision with which the set screws can be initially adjusted, can be minimal for free rotation.

The end cap is threadedly connected to the drive shaft and can quickly be removed therefrom for cleaning. On reassembly, the end cap can be quickly screwed onto the drive shaft until there is contact between the abutment surfaces of the members. When this occurs, the same precise clearance between the turret and the base plate will be provided without time consuming adjustment.

It is therefore one object of the present invention to provide mechanism in food processing machinery for mounting a rotary member on a base with minimal clearance for rotation. It is another object of the present invention to provide mechanism in food processing machinery for mounting a rotary member on a base in which the members can be disassembled for cleaning and reassembled with the same precise clearance without time consuming readjustment.

In the drawings:

FIGURE 1 is a side elevation, partly in cross-section, of the mechanism of the present invention; and FIGURE 2 is a view taken on the line 2—2 of FIGURE 1.

In food processing machines of the type disclosed in the above-mentioned Patent No. 3,153,808, a meat-patty forming turret receives meat from a supply hopper and delivers it to a patty unloading mechanism. The present invention is particularly concerned with an improved patty forming turret and in the disclosed embodiment the turret has a rotatable drive shaft 10 extending through one stationary base member 11a and into a second stationary base member, or plate, 11b. The drive shaft 10 is journalled in a cylindrical standard 12 which is connected to the base member 11a and is positioned between the two base members 11a and 11b. A collar 13 is secured to the drive shaft 10 above the standard 12, and a plastic washer 9 is interposed between the collar and the standard. A circular turret, or turntable 14, is received on the shaft between the collar 13 and the base plate 11b, and is keyed to the shaft, as indicated at 15, for rotation with the shaft. The turret has a plurality of angularly spaced cylindrical bores, or pockets 16, which receive meat as the turret is rotated past a loading station indicated at 17. An annular plate 18, which is located below the turret and spaced therefrom by spacers 19, is connected to the turret by bolts 20 for rotation with the turret. A piston 21 is slidably received in each of the bores 16, and each piston has a connecting rod 22 which is jouralled in and keyed to the plate 18.

A sleeve 25 is loosely received over the cylindrical standard 12. The sleeve 25 has a radially extending cam track 26 which is engaged by a roller 27 connected to the end of each connecting rod 22. A spring 28, mounted between the plate 18 and a cup 29 secured to each connecting rod, urges the roller 27 into engagement with the cam track 26. A second cam track 30 is mounted to the base member 11a under an unloading station, designated by the numeral 31, and is located 180° from the loading station 17.

Meat is deposited in the bores 16 of the turret at the loading station 17. Each pocket is filled to be level with the upper surface of the turret 14. It will be noted that the piston 21, which is positioned by the cam track 26, is in a predetermined lowered position at the loading station to define a pocket of the appropriate size for the meat patties. As each bore 16 moves into the unloading station, the piston therein is raised by the cam track 30 to discharge the patty from the pocket.

It is essential that the clearance gap 32 between the turret 14 and base plate 11b be adequate (such as .004 inch) for proper rotation of the turret, but not large enough to permit the entry of meat. Any thin edge of meat which spreads beyond the boundary of the pocket during the formation of the patty is undesirable because it burns when the patty is cooked. More serious, however, is the problem of meat which becomes lodged between the turret 14 and the base plate 11b, because this meat can spoil and contaminate some patties. Accordingly, it is very important that the gap 32 be kept at a constant minimal dimension, even after disassembly and reassembly of the turret from the base for cleaning.

The drive shaft 10 has a threaded bore 36 at its upper end which receives the threaded stud 37 of an end cap 38. The end cap 38 and the upper end of the drive shaft 10 define a two part hub which holds the turret 14 in operating relationship with the base plate 11b. The hub is readily separable because the threaded stud 37 can be easily unscrewed, or released, from the drive shaft, rendering the end cap quickly detachable from the drive shaft. The end cap 38 has a flange 39 and, when the cap 38 is in assembled relation with the shaft 10, a plastic washer 40 is received between the flange 39 and the base plate 11b. A pair of set screws 41 are threadedly received in the end of the drive shaft 10 and extend therefrom through a slot 42 in the washer. The washer 40, which is preferably made of nylon, constitutes a low friction bearing which, because the set screws engage the sides of the slot, rotates with the hub and turret and prevents the end cap from unscrewing during rotation of the turret. Each set screw has a head 43, the upper surface of which defines an abutment surface to contact the abutment surface defined by the lower edge of flange 39 on the cap. The set screws are locked in an adjusted position by lock nuts 44.

It will be noted that this construction provides a first flange (collar 13) secured on the drive shaft and a second flange 39 on the end cap which hold the turret 14 and base plate 11b in operating relationship. The two flanges can be positioned precisely relative to each other because the set screws, which extend between the drive shaft and the flange on the end cap, define stop members against which the cap is screwed for proper positioning of the end cap (and flange thereon) relative to the drive shaft (and flange thereon). These set screws can be carefully and accurately adjusted, and locked in adjusted position by the lock nuts 44, to establish a precise span between the two flanges. Although the end cap can be quickly and easily removed for disassembly of the turret from the base plate for cleaning, unscrewing the end cap from the drive shaft does not disturb the setting of the set screws. Therefore, when the mechanism is reassembled after cleaning, the end cap is again screwed into the drive shaft until the flange on the end cap abuts the heads of the set screws, and the span between the two flanges will be identical to the span as it was initially established. Since the thickness of the turret 14, the base plate 11b, and the washer 40 remain unchanged, the clearance 32 between the base plate and the turret will remain the same.

It should be noted that the drive shaft is supported by the base plate 11b through the washer 40 and end cap 38. The drive shaft, in turn, supports the turret 14 through the collar 13. Therefore, the only significant clearance between the two flanges will be the clearance 32 between the base plate 11b and the turret 14. Since the base plate 11b is stationary, and the turret 14 rotates during operation, it is between these members that a clearance is necessary for proper rotation.

With this construction the desired and necessary clearance between the base plate 11b and the turret 14 can be carefully set once, and then maintained without readjustment, despite repeated disassembly and reassembly of the unit for cleaning.

Although the best mode contemplated for carrying out the present invention has been herein shown and described, it will be apparent that modification and variation may be made without departing from what is regarded to be the subject matter of the invention as set forth in the appended claims.

I claim:

1. In a food processing machine, mechanism for mounting a rotary turntable member to a base comprising a shaft having spaced apart flanges straddling the rotary member and the base to hold the rotary member and base in operating relationship, one of said flanges being adjustable axially on said shaft and separable from the shaft for assembly and disassembly and extending radially over said base member for operative engagement therewith, and the other flange being secured to the shaft for rotation therewith, and an axially adjustable abutment means between the end of said shaft and separable flange located radially inwardly of the area of operative engagement between the flange and base to determine precisely the span between the flanges so as to assure exact clearance between the rotary member and the base to exclude food particles therebetween with a minimal operating clearance.

2. Mechanism for mounting a rotary turret to a base plate in a food molding machine comprising
  (a) a shaft having a flange thereon, said shaft being received in the turret and base plate with said flange located on one side of said turret and base plate,
  (b) a cap adapted for threaded engagement with the end of the shaft, said cap having a radial flange on the other side of said turret and base plate which overlies said base plate for operative engagement therewith, and
  (c) an adjustable stop member extending between the end of the shaft and the flange on the cap and located radially inwardly of the area of operative engagement between the cap flange and base plate to establish the span between said members when the cap is in threaded engagement with the shaft.

3. The mechanism of claim 3 in which the cap is adjacent the base plate and a plastic washer is received between the flange on the cap and the base plate, said washer having an opening to receive said stop member.

4. Mechanism for mounting a rotary turret to a base plate in a meat molding machine comprising
  (a) a rotatable drive shaft having a flange thereon, said shaft extending into the turret and base plate with said flange adjacent said turret,
  (b) a cap adapted for threaded engagement with the end of the shaft, said cap having a flange adjacent the base plate,
  (c) a pair of set screws threadedly received in the end of the drive shaft, each set screw having a head adapted for engagement with the flange on the end cap when the cap is connected to the drive shaft, and (d) a plastic washer received between the base plate and the flange on the end cap, said washer having a slot to receive the set screws, said washer being rotated by the set screws when the drive shaft is rotated.

References Cited

UNITED STATES PATENTS

| | | | |
|---|---|---|---|
| 927,978 | 7/1909 | Kelly | 287—100 |
| 2,208,276 | 7/1940 | McCann | 287—101 |
| 2,718,419 | 9/1955 | Chapman | 287—100 |
| 2,755,037 | 7/1956 | Sarah | 287—53 |
| 3,153,808 | 10/1964 | Weien | 17—26 |
| 3,382,528 | 5/1968 | Noble | 17—32 |

CARL W. TOMLIN, Primary Examiner

ANDREW V. KUNDRAT, Assistant Examiner

U.S. Cl. X.R.

17—32